(12) United States Patent
Krause et al.

(10) Patent No.: US 8,855,189 B1
(45) Date of Patent: Oct. 7, 2014

(54) MULTI-STREAM TRANSCODING SYSTEM WITH CACHE MEMORY MANAGEMENT

(75) Inventors: Edward A Krause, Saratoga, CA (US); Peter A Monta, Palo Alto, CA (US)

(73) Assignee: UV Networks, Inc., Cupertino, CA (US)

( * ) Notice: Subject to any disclaimer, the term of this patent is extended or adjusted under 35 U.S.C. 154(b) by 670 days.

(21) Appl. No.: 13/085,471

(22) Filed: Apr. 12, 2011

Related U.S. Application Data (60) Provisional application No. 61/323,319, filed on Apr. 12, 2010.

(51) Int. Cl.
*H04N 7/12* (2006.01)
*H04N 11/02* (2006.01)
*H04N 11/04* (2006.01)
*H04J 4/00* (2006.01)
*G06F 7/00* (2006.01)
*G06F 17/00* (2006.01)
*G06F 17/30* (2006.01)
*G06F 12/00* (2006.01)

(52) U.S. Cl.
USPC ........... 375/240; 370/307; 707/609; 707/636; 707/654; 707/662; 707/720; 707/748; 707/799; 707/812; 707/821; 707/825

(58) Field of Classification Search
USPC ......................................................... 375/240
See application file for complete search history.

(56) References Cited

U.S. PATENT DOCUMENTS

| | | | |
|---|---|---|---|
| 2005/0246451 A1* | 11/2005 | Silverman et al. ............ | 709/231 |
| 2006/0001558 A1 | 1/2006 | Gabriel et al. | |
| 2007/0015692 A1 | 1/2007 | Ramailingan et al. | |
| 2008/0162713 A1* | 7/2008 | Bowra et al. .................. | 709/231 |

* cited by examiner

*Primary Examiner* — Joseph Ustaris
*Assistant Examiner* — William Adrovel
(74) *Attorney, Agent, or Firm* — Patents and Licensing LLC; Daniel W Juffernbruch

(57) ABSTRACT

Both live and offline transcoding of media is managed for storage in a cache. Requests for media are made by a client on a network and media taken from the cache and transcoded for delivery to the client. Media is also transcoded and stored in memory during idle request in anticipation of future requests during idle transcoder time between client requests. A prioritizer manages at least offline transcoding requests. A high priority queue operates at a higher priority than the low priority queue. The high priority queue receives live transcoding requests from a client on the network. A low priority queue receives offline transcoding requests. A media transcoder primarily transcodes media in accordance with requests from the high priority queue for delivery to a client on the network and then secondarily transcodes media in accordance with requests from the low priority queue when the high priority queue is empty. According to alternative embodiments the media transcoder transcodes media into segments and to modify frames when necessary to insure that they are decodable without accessing other segments.

22 Claims, 8 Drawing Sheets

MULTI-STREAM TRANSCODING SYSTEM WITH CACHE MEMORY MANAGEMENT

BACKGROUND OF THE INVENTIONS

1. Technical Field

The present inventions relate to transcoders and, more particularly, relate to management of transcoding with cache.

2. Description of the Related Art

Video signals have traditionally been broadcast from terrestrial transmission towers direct to the home, or broadcast from uplink centers to orbiting satellites for retransmission to the home, or the video may have been broadcast/distributed using public or privately-owned cable television networks. Today, as internet infrastructure continues to improve, more and more video is being uploaded, stored and maintained within the internet cloud, and more and more content is being distributed to media-capable viewing devices including set top boxes, television receivers, smart phones, notebooks, tablets and desktop computers. New viewing habits are also emerging. In addition to the more passive model of selecting broadcast content by channel surfing or scanning program guides, viewers are also using interactive searching tools and services to scan from libraries of individualized content and are interactively controlling the way this content is streamed to their personal media-playing device. For example, if the content is unicasted instead of broadcasted, then the user may be able to pause, change playback speed, or manage the streaming of content in various other ways without depending on local storage devices to implement the time-shifting functions.

As the variety of content origination sources increases, so has the diversity of compression formats, video quality, and data rate requirements for real-time streaming. At the same time, the capabilities of the various media playback devices have also become more variable and diverse. This raises the problem of compatibility mismatches.

Most media playback devices only support a small subset of the commonly used compression formats, which include H.264, VC1, MPEG4 ASP, MPEG2, MPEG1, H.263, Theora, and additional codecs associated with the FLASH container format. Similar compatibility mismatches occur between the audio codec formats and audio decoding capabilities of the client devices, and even more variability exists in the choice of container format used to merge the various video, audio and data components into a single stream. The problem is further complicated by the unpredictability of the underlying capacity of the network which can vary by transmission medium, region, and time of day. For example, a typical cellular network relied upon by mobile devices may be incapable of accommodating a high quality HD video stream even under the best of conditions. These problems are often dealt with by controlling the range of client devices that may be used to access a particular subset of content, in much the same way that cable companies have restricted their customers to use certain set top box models. A better alternative is to modify the video and audio content so that it becomes compatible with both the client device that is requesting the content, as well the network that is delivering it.

The problem of converting video and audio signals from one format to another, and/or from one data rate and quality level to a lower data rate and quality level, has been solved. Transcoders exist for this purpose. Unfortunately, transcoding to or from one of the more efficient video compression formats such as H.264 can be expensive, and usually requires dedicated hardware depending on the number of streams to be processed, real-time requirements, resolution, frame rate, and budget. As transcoding capacity is scaled to keep up with constantly increasing traffic demands, the efficiency, complexity, and cost of the transcoding solution becomes more critical. An efficient and scalable high-capacity transcoding solution is needed.

BRIEF DESCRIPTION OF THE DRAWINGS

The present inventions are illustrated by way of example and are not limited by the accompanying figures, in which like references indicate similar elements. Elements in the figures are illustrated for simplicity and clarity and have not necessarily been drawn to scale.

The details of the preferred embodiments will be more readily understood from the following detailed description when read in conjunction with the accompanying drawings wherein.

DETAILED DESCRIPTION OF THE PREFERRED EMBODIMENTS

Ramalingan et al. US Patent Publication No. 2007/0156924 entitled Method and Apparatus for Transcoding and Transrating in Distributed Video Systems disclose transcoding for compatibility between different types of client devices. Gabriel et al. US Patent Publication No. 2006/0015580 entitled Multimedia Content Distribution disclose both transcoding and storage resources. However, transcoding is applied to achieve format compatibility but does not deal with matching rate to available channel bandwidth (see FIG. 2 of Gabriel et al.) which may vary over time. Also, Gabriel et al. do not optimize and balance transcoding and storage resources.

Both live and offline transcoding of media is managed for storage in a cache in the present inventions of the embodiments described herein. Requests for media are made by a client on a network and media taken from the cache and transcoded for delivery to the client. Media is also transcoded and stored in memory during idle request in anticipation of future requests during idle transcoder time between client requests.

A prioritizer manages at least offline transcoding requests. A high priority queue operates at a higher priority than the low priority queue. The high priority queue receives live transcoding requests from a client on the network. A low priority queue receives offline transcoding requests. A media transcoder primarily transcodes media in accordance with requests from the high priority queue for delivery to a client on the network and then secondarily transcodes media in accordance with requests from the low priority queue when the high priority queue is empty. According to alternative embodiments the media transcoder transcodes media into segments and to modify frames when necessary to insure that they are decodable without accessing other segments.

Figure 1:
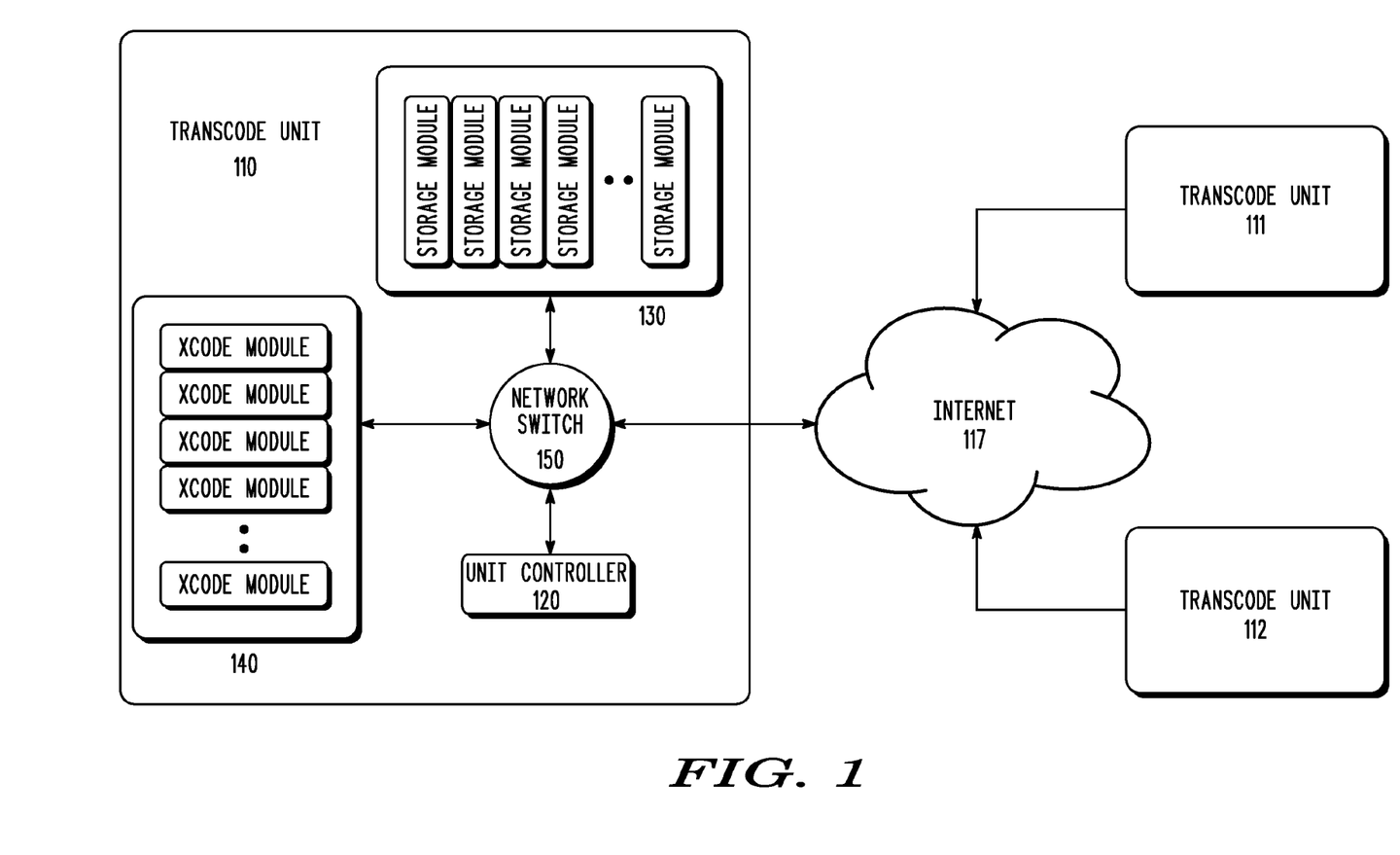
FIG. 1 illustrates a schematic block diagram of a high-level diagram of a video transcoding system according to the present inventions.

A high-level diagram of a video transcoding system is shown in FIG. 1. One or more Transcode Units 110, 111, 112 may be located at various locations within the internet cloud 117 as shown, or the subsystems may be contained to a cable distribution network, satellite uplink centers, or even the home. As new content becomes available, it may be copied to the one or more storage modules 130, under the control of a Unit Controller 120. The Unit Controller 120 may receive requests via a network switch 150 to retrieve stored content for playback, or alternatively, a stream may be provided with the request that it be transcoded to a different format or to a lower resolution or bit rate. In the case of transcoding requests, the Unit Controller 120 would enable the incoming stream to be forwarded to the one or more transcoders 140, and then returned or rerouted to a destination address. In the case of retrieval requests, the available stored content would be compared with the decoding capabilities of the client and the current streaming capacity of the network. If a compatible version of the requested file is present in the storage subsystem and if the data rate does not cause the network capacity to be exceeded, then the file is simply retrieved from storage 130 and forwarded to the destination. Otherwise, if the requested content is available but is not compatible with the requesting client or cannot be accommodated by the network, then the file is first forwarded from the storage subsystem 130 to the transcoding subsystem 140. For best results, the original version of the file should be used if multiple versions exist. As the file is transcoded and forwarded to the destination, a copy is saved in the storage system 130, so that the transcoding step need not be repeated if similar requests are received at a later point in time.

In some cases, it may be advantageous to partition the storage subsystem 130 into two sections. The first section would be used for maintaining the original version of each file, while the second section would be used as a cache for maintaining the transcoded reproductions. The size of the cache partition could be capped to a specified size, or preferably adjusted dynamically to consume all available space. Space could be released when needed for new content by automatically deleting the files from the cache partition with lowest assigned priority. The content of the cache partition would be managed by processes internal to the video transcoding subsystem, while original files in the main partition are assumed to be added or deleted under the control of a separate management system.

Figure 2:
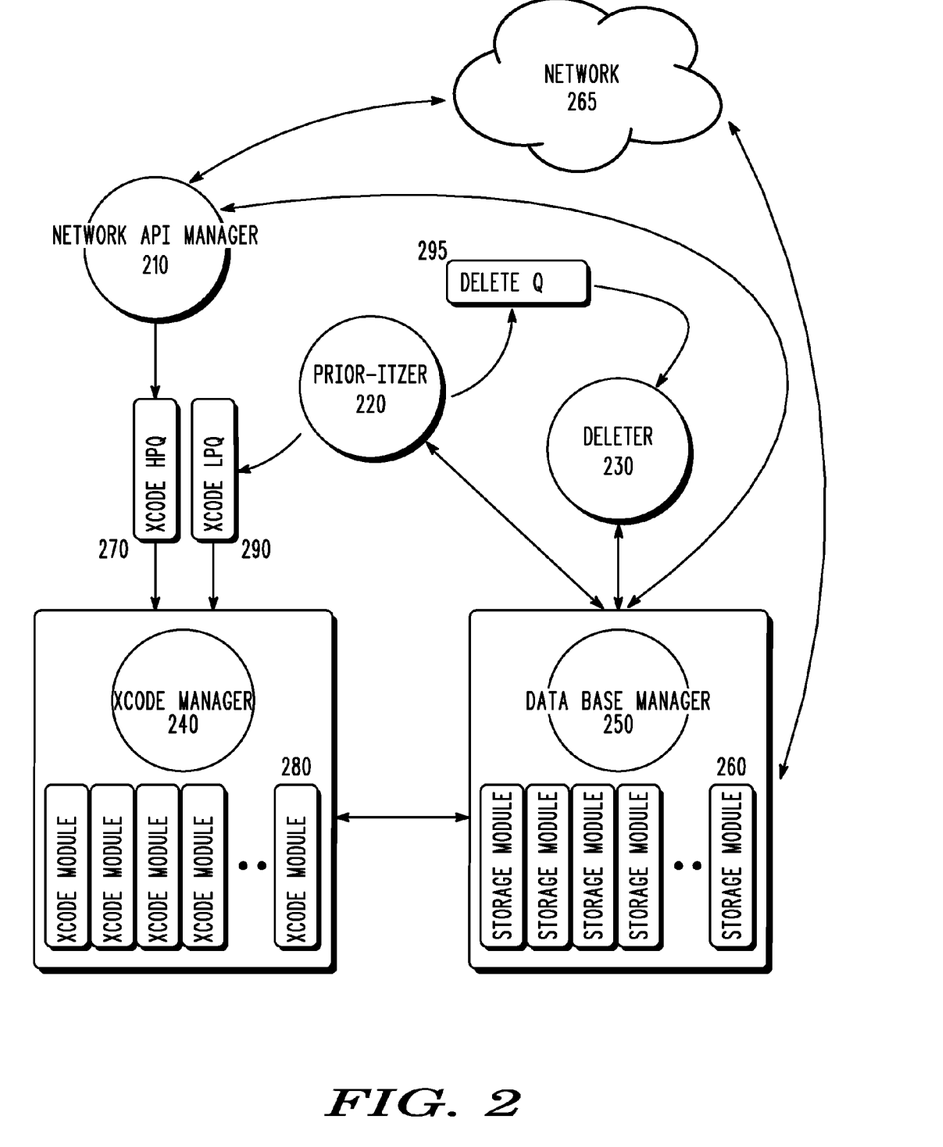
FIG. 2 illustrates a schematic block diagram of a detailed representation of the transcode unit according to the present inventions.
Figure 3:
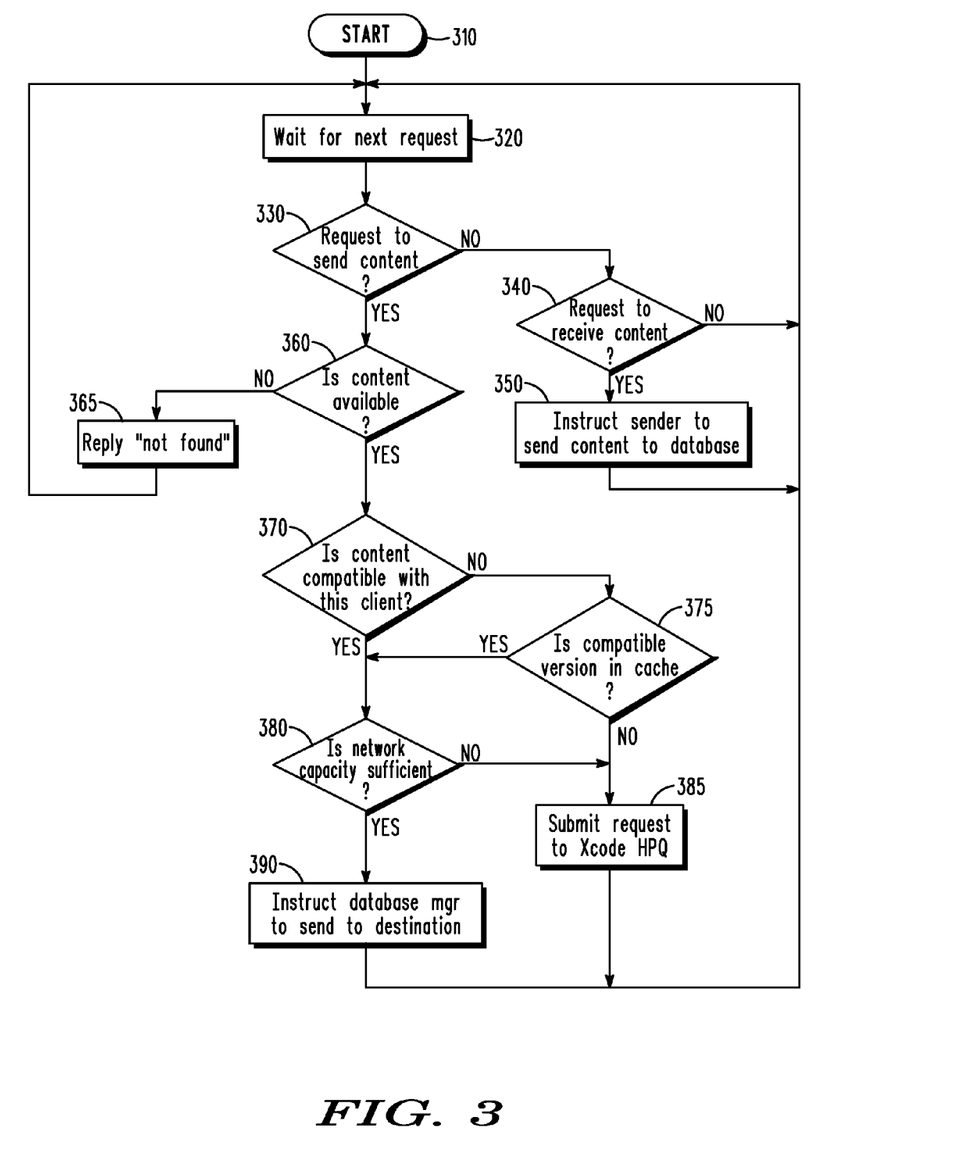
FIG. 3 illustrates a simple flowchart depicting the operation of the Network API Manager according to one embodiment of the present inventions.

A more detailed representation of the Transcode Unit is shown in FIG. 2 where the Unit Controller has been partitioned into a Network API Manager 210, Prioritizer 220, Deleter 230, Xcode Manager 240, Database Manager 250 and associated memory queues. The Network API Manager 210 is the interface to an external network 265. If a request is received to transcode new content or to simply add new content to the storage array 260, then the database is updated by communicating with the Database Manager 250, and a local network address is provided to allow the content to be streamed from the external network directly to the storage array 260. If the content is to be transcoded, then the Network API Manager 210 also deposits a request into an Xcode High Priority Queue (HPQ) 270. A simple flowchart depicting the operation of the Network API Manager 210 is shown in FIG. 3.

If idle transcoder (Xcode) modules are available, then the next entry is retrieved from the Xcode High Priority Queue 270 and the content corresponding to the request is retrieved from the storage array 260, processed by a transcode (Xcode) module 280 and returned to the external network destination. At the same time, a copy of the transcoded result is saved in the cache section of the storage array 260. Alternatively, the transcoded content could be streamed directly to the storage array 260, and streaming to the external network 265 could originate from the storage array 260 instead of the xcode array. This would allow the one or more transcoder modules 280 to operate at their native processing rates which could exceed the capacity of the external network 265 or the playback requirements of a client or destination target. In this way, the storage array 260 would serve as a buffer and transcoding modules 280 would be released as soon as possible and made available for servicing other requests.

The Prioritizer 220 is a background process which communicates with the Database Manager 250 in order to assign priorities to the various files maintained within the storage array 260. The files with the lowest priority are assigned entries in a Delete Queue 295. The Prioritizer 220 continues to add entries to this Delete Queue 295 until it becomes full and organizes the Delete Queue 295 such that the entries corresponding to the lowest priority files would be placed at the head of the Delete Queue 295. When additional space in the cache section of the storage array 260 is needed to accommodate a new request, the Deleter 230 module retrieves the next entry from the head of the Delete Queue 295 and instructs the Database Manager 250 to delete the corresponding file.

It is recommended that the Database Manager 250 always check if the corresponding file is in use before proceeding with a delete request. In the unlikely case that this lowest priority file is currently being streamed to one or more clients, the file should not be deleted and the next entry should be extracted from the Delete Queue 295 and processed instead.

Figure 4:
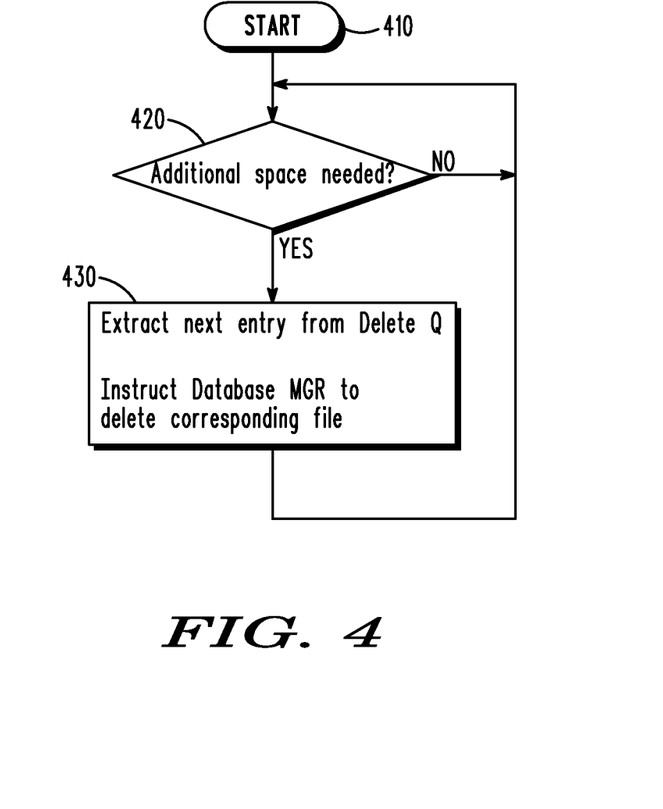
FIG. 4 illustrates a flowchart summarizing the operation of the deleter according to one embodiment of the present inventions.

The Deleter 230 may be an independent background process which continues to extract entries from the head of the Delete Queue 295 and continues to instruct the Database Manager 250 to delete the corresponding files until sufficient space becomes available to accommodate the pending requests for additional storage. A flowchart summarizing the operation of the Deleter 230 is shown in FIG. 4. With the exception of communicating with the Deleter 230 when additional storage space is needed, the functions and construction of the Database Manager 250 is well understood. For example, SQL and various other kinds of database software are readily available.

In addition to identifying the files in the cache section of the storage array which are next in line for deletion, the Prioritizer 220 also scans the programs in the main section of the storage array. For each program, the Prioritizer 220 considers the encoding format, video resolution, and data rate and predicts the formats, resolutions, and rates which are most likely to be needed in order to satisfy future requests. This prediction should consider the requirements of the clients which are likely to access the system, as well as the capabilities of the distribution network. The best source of data for generating these predictions is the history of recent client requests and the history of recent network performance. For each file the predictions of the mostly likely transcoded representations that will be needed to satisfy future requests can be mapped to the same priority scale used to assign entries in the Delete Queue 295.

Figure 5:
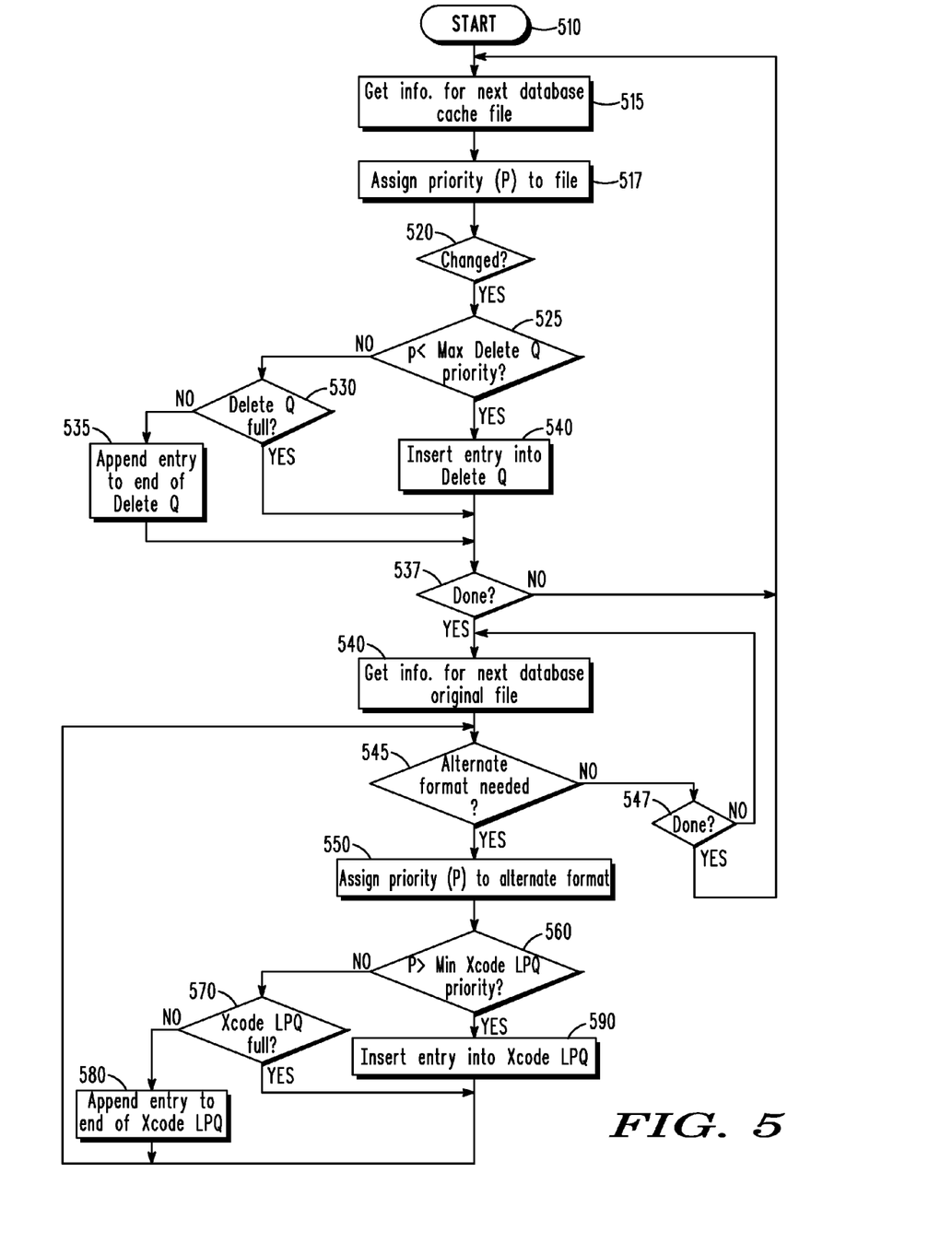
FIG. 5 illustrates a flowchart depicting the prioritizer processes of maintaining the Xcode High Priority Queue and the Xcode Low Priority Queue according to one embodiment of the present inventions.

If a transcoded representation does not already exist in the cache section of the storage array 260, then an entry is inserted into an Xcode Low Priority Queue (LPQ) 290. The Prioritizer 220 organizes requests in the Xcode Low Priority Queue 290 such that the entries with the highest assigned priority are placed at the head of the queue. A flowchart summarizing the two Prioritizer processes of maintaining the Xcode High Priority Queue 270 and the Xcode Low Priority Queue 290 is shown in FIG. 5.

Figure 6:
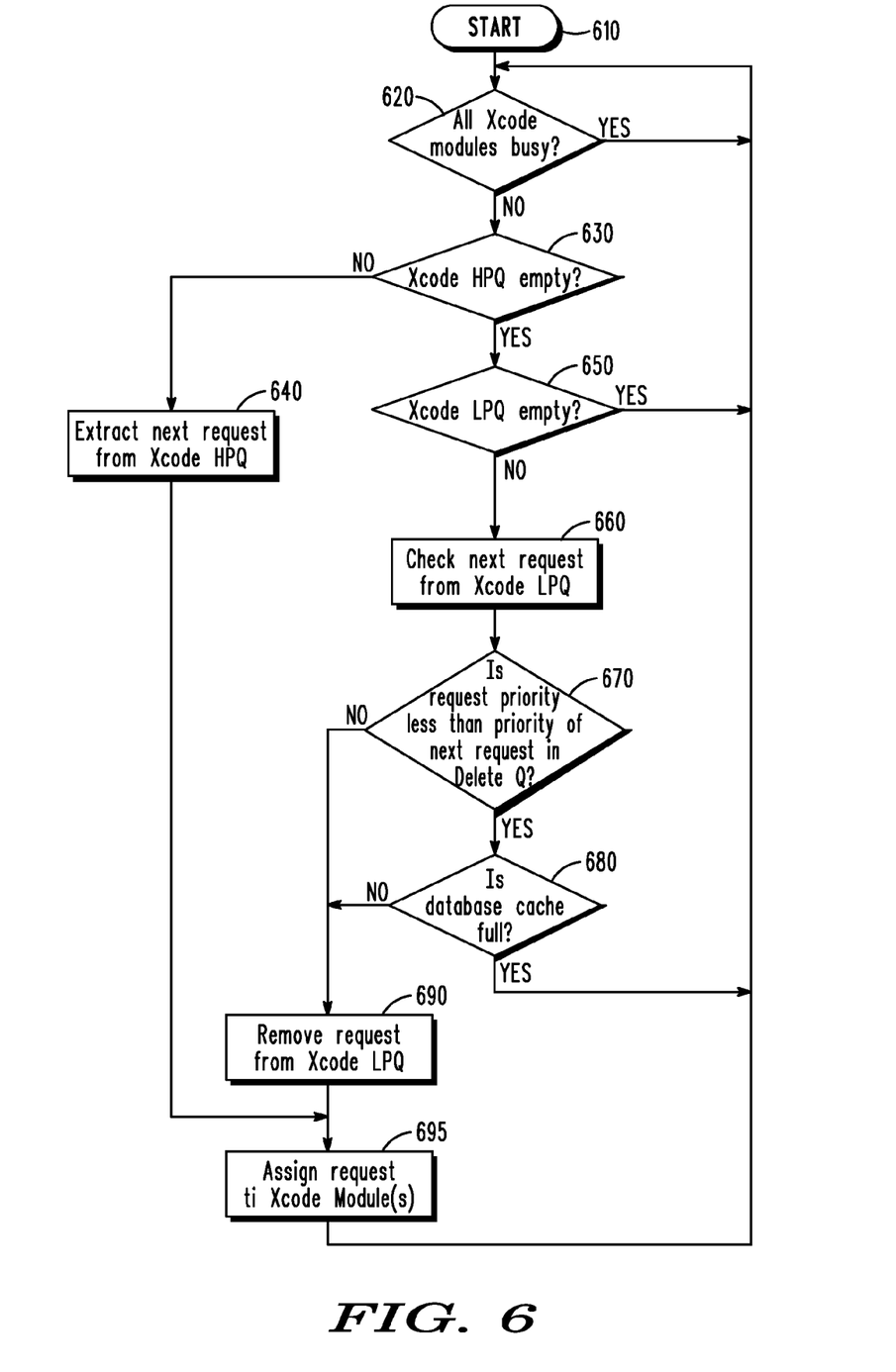
FIG. 6 illustrates a flowchart depicting the operation of the Xcode Manager according to one embodiment of the present inventions.

When one or more transcoding modules are idle, the Xcode Manager 240 checks to see if a new request is pending at the head of the Xcode High Priority Queue 270. If this queue is not empty, then the next entry is selected and the transcoding task corresponding to this entry is launched. However, if the Xcode High Priority Queue 270 is empty, then the Xcode Manager 240 checks to see if a new request is pending at the head of the Xcode Low Priority Queue 290. If this queue is not empty, then the next entry will be selected and processed if either of two conditions are met. There must either be room in the cache to accommodate the output that will be generated by this next transcoding request, or the priority that was assigned to this entry by the Prioritizer 220 must exceed the priority of the next entry at the head of the Delete Queue 295 corresponding to the next file to be deleted from cache 260. Otherwise, there is no advantage to introducing a new file to the cache 260 if it causes one or more higher priority files to be deleted. In principle, one should also assign a priority to each entry in the Xcode High Priority Queue 270 and compare this priority with the next entry at the head of the Delete Queue 295 in order to determine if the transcoded stream should be saved in the cache 260. However, in practice, the priority assignment algorithm should be adjusted to virtually insure that the transcoded file corresponding to the high priority request is assigned a spot in the cache. In general there is always a high probability of a repeat request from the same client when full interactivity is supported within the distribution system. A flowchart describing the operation of the Xcode Manager is shown in FIG. 6.

It is advantageous to adjust the algorithm used by the Prioritizer 220 to assign priorities to the various existing and non-existing file representations by considering previous requests. If the objective is to assign a priority that is approximately representative of the likelihood that the file will be requested during a next time interval (a time interval may be a specified number of hours), then one only needs to extrapolate from previous requests. The extrapolation can be performed in a very simple way, for example by predicting that the number of requests will be the same as it was in the most recent time interval, or the extrapolation could be more elaborate and use well-known regression techniques. For example, mathematical equations could be derived based on an analysis of all available historical data, and the equations could then be extrapolated to predict the number of requests that will be received during the next time interval.

It is also advantageous to consider certain additional factors when assigning a priority to the existing file representations. In particular, the most efficiently compressed representations, which generally have a high regeneration cost, should be favored over the less efficient versions which might be regenerated more easily. For example, a high definition video signal encoded using a modern codec such as H.264, configured to take full advantage of the standards most advanced features and settings, will consume much more transcoding resources for a longer period of time than an alternative representation generated by reducing the same source content to standard definition and using the MPEG2 compression standard configured with a reduced motion vector search range and no B-frames. The transcoding system may be incapable of regenerating the more efficient representation in real-time, whereas the less efficient representation may have been generated as a last resort while responding to a high priority request at a time when minimal transcoding resources were available. Clearly, it may be advantageous to generate a less-efficient representation at times when transcoders are busy, particularly if excess network capacity permits the option of a higher data rate instead of a reduction in video quality. However, if a more efficient representation was generated at a time when the system had resources to spare, perhaps by utilizing multiple transcoder modules for intervals exceeding the duration of the content, then this result should be assigned the greater value and retained in cache for a longer period of time.

The transcoding system that has been described thus far is still inefficient in one respect. Each incoming request received by the Xcode Manager 240 corresponds to a program that could be two or more hours in duration. Even if the transcoder modules are capable of processing faster than real time, the modules assigned to each new request will be occupied for long intervals before becoming available to accommodate a next request. If a higher priority request is received during this time and if all other transcoding modules 280 are similarly occupied, then either the new high priority request must be rejected, or one or more existing transcoding processes terminated and the resources reassigned to accommodate the new request. Normally, such reassignments would render the partially processed lower priority stream useless, and the time spent generating it would have been wasted. However, a more efficient solution is to partition all content into segments, preferably with a fixed duration. For example, all streams could be partitioned into a sequence of 2 second segments, and this segmentation could be performed external to the transcoding system or the segmentation could be implemented in the Xcode Manager 240 after the request is accepted from either the Low or High Priority Queues 290. Each stream segment could then be assigned to a different transcoding module, and in this way it becomes possible to parallelize the transcoding process and greatly reduce the time needed to process a single program.

FIG. 3 illustrates a simple flowchart depicting the operation of the Network API Manager according to one embodiment of the present inventions. In the flowchart of FIG. 3, flow starts at step 310. Thereafter step 320 waits for the next request. Then determine if there was a request to send content at step 320. If no, go to step 340 and determine if there was a request to receive content. Then if the answer to step 340 is no, flow returns to step 320. Then if the answer to step 340 is yes, the sender is instructed to send content to a database at step 350 and thereafter flow returns to step 320. If step 330 determined a request to send content was yes, then flow continues to step 360. At step 360, it is checked if content is available. If the content was not available in step 360, flow proceeds to step 365 where a "not found" reply is processed and flow returns to step 320. If content is available in step 360, flow proceeds to step 370. In step 370 it is determined if content is compatible with this client. If the answer to step 370 is no, flow proceeds to step 375. In step 375 it is determined if a compatible version is in the cache. If a compatible version is in the cache as determined by step 375, flow proceeds to step 380. At step 380 is determined if the network capacity is sufficient. If the network capacity is insufficient as determined by step 380, flow proceeds to step 385. If a compatible version is not in the cache as determined by step 375, flow proceeds to step 385. At step 385 a request is submitted to Xcode high priority queue and flow returns to step 320. If the network capacity was sufficient as determined by step 380, flow continues to step 390. In step 390 the database manager is instructed to send to the destination and thereafter flow returns to step 320.

FIG. 4 illustrates a flowchart summarizing the operation of the deleter according to one embodiment of the present inventions. In the flow chart of FIG. 4, flow starts at step 410. Thereafter it is determined if additional space is needed in step 420. If no additional space is needed, flow returns to step 420. If additional space is needed, flow continues to step 430. At step 430, next entries are extracted from the delete queue. The database manager is also instructed to delete corresponding file and, thereafter, flow returns to step 420.

FIG. 5 illustrates a flowchart depicting the prioritizer processes of maintaining the Xcode High Priority Queue and the Xcode Low Priority Queue according to one embodiment of the present inventions. In the flowchart of FIG. 5, flow starts at step 510. Thereafter at step 515 the flow gets information for the next database cache file. Thereafter at step 517 a priority (P) is assigned to the file. Thereafter step 520 determines if it has changed. If it has changed in step 520, flow proceeds to step 525. If it has not changed in step 520, flow returns to step 515. In step 525 it is determined if p<Max Delete Q Priority? If no, flow proceeds to step 530. If yes, flow proceeds to step 540. At step 530 determine if the delete queue is full. If the delete queue is not full, proceed to step 535. At step 535 append entry to end of the delete queue and continue to step 537. If the delete queue is full as determined by step 530, proceed to step 537. At step 537 determine if it is done. If it is not done, as determined by step 537, return to step 515. If it is done, as determined by step 537, continue to step 540. At step 540, get information for the next database original file and thereafter proceed to step 545. At step 545 determine if an alternate format is needed. If an alternate format is not needed, as determined by step 545, proceed to step 547. At step 547 determine if it is done. If it is done, return to step 515. If it is not done, as determined by step 547, then return to step 540. If the alternate format was not needed as determined by step 545, then in step 550 assign a priority (P) to alternate format and thereafter proceed to step 560. At step 560 determine if P>Min Xcode low priority queue priority. If the result of step 560 is no, proceed to step 570. At step 570 determine if the Xcode low priority queue is full. If the result of step 570 is yes, return to step 545. If the result of step 570 is no, go to step 580. At step 580 append the entry to the end of Xcode in the low priority queue and thereafter return to step 545.

FIG. 6 illustrates a flowchart depicting the operation of the Xcode Manager according to one embodiment of the present inventions. In the flowchart of FIG. 6, flow starts at step 610. Thereafter at step 620 it is determined if all Xcode modules are busy. If all Xcode modules are busy as determined by step 620, flow returns to step 620. If all Xcode modules are not busy as determined by step 620, flow proceeds to step 630. Step 630 determines if the Xcode high priority queue is empty. If the Xcode high-priority queue is not empty as determined in step 630, flow proceeds to step 640. At step 640 the next request is extracted from the Xcode high priority queue and thereafter flow proceeds to step 695. At step 695 a request is assigned to Xcode modules and flow returns to step 620. If the Xcode high priority queue is empty as determined by step 630, flow proceeds to step 650. At step 650 it is determined if the Xcode low priority queue is empty. If the Xcode low priority queue is empty as determined by step 650, flow returns to step 620. If the Xcode low priority queue is not empty as determined by in step 650, flow proceeds to step 660. At step 660 the next request from the Xcode low priority queue is checked and thereafter flow continues to step 670. At step 670 it is determined if the request priority is less than the priority of the next request in the delete queue. If yes is determined by step 670, flow proceeds to step 680. At step 680 it is determined if the database cache is full. If the database cache is full as determined by step 680, flow returns to step 620. If the database cache is not full as determined by in step 680, flow continues to step 690. If the result of step 670 is no, flow proceeds to step 690. At step 690, the request is removed from the Xcode low priority queue and thereafter flow proceeds to step 695. At step 695 a request is assigned to Xcode modules and flow returns to step 620.

In practice, it may not be possible to adopt a common segment duration in systems where content is aggregated from multiple sources and where content was generated using a variety of encoders each configured with different settings. In general, when more efficient codecs are used, it becomes impossible to decompress a single image frame without first decoding the image frames which precede it. Therefore if a stream is partitioned at a frame boundary corresponding to a predetermined segmentation point, then the first frames of the new segment may be rendered undecodable once the two segments are separated. Fortunately, it is common to encode video such that random access points are introduced at somewhat regular intervals and the segmentation point is easily adjusted to coincide with the nearest one. The first image frame encountered after a random access point is always an I-frame. Unlike the more common P- and B-frames, an I-frame can always be decoded without referencing other decoded frames. In some cases, one or two frames encountered after the I-frame might still be undecodable if the frames preceding the point of random access are unavailable, but such frames can be discarded and reassigned to the previous segment as demonstrated by the example of FIG. 7.

Figure 7:
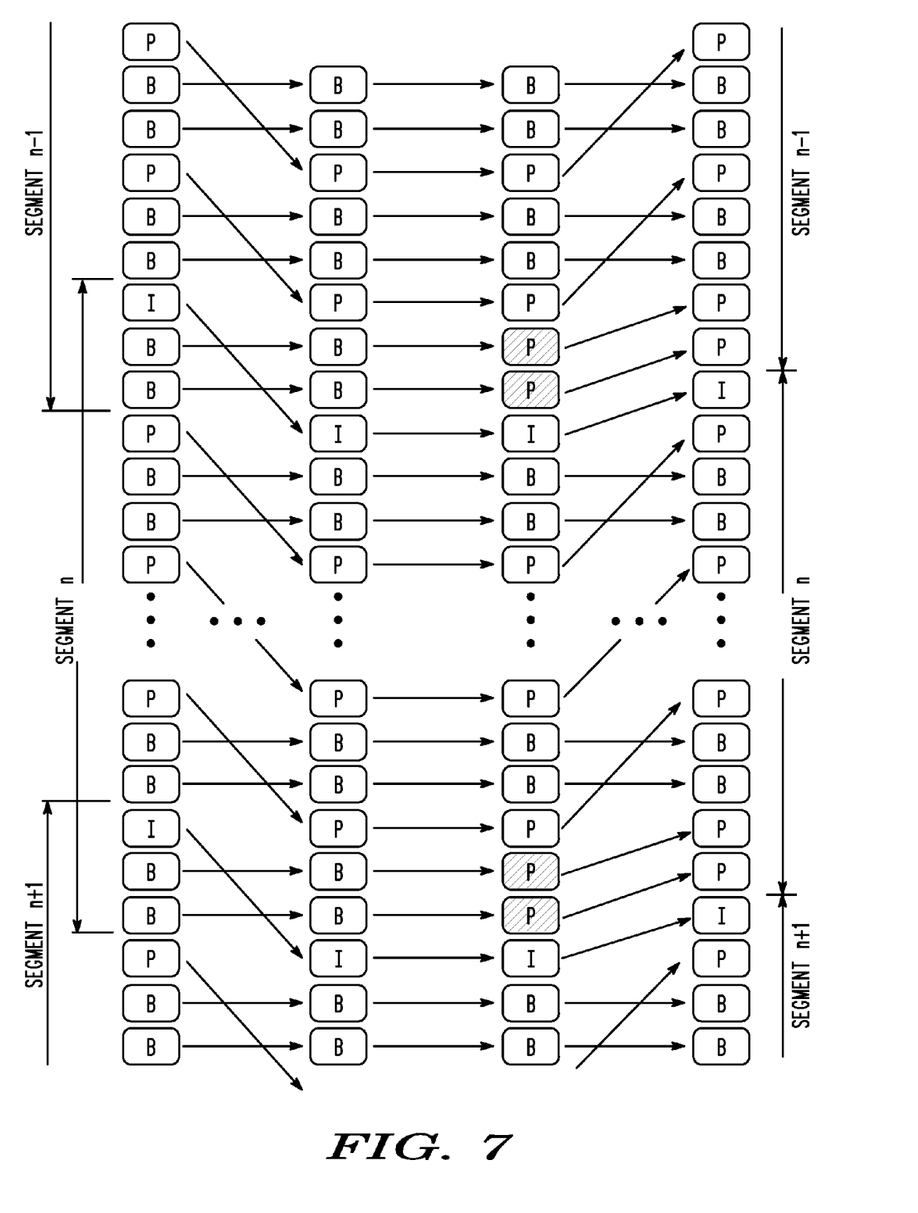
FIG. 7 illustrates a four column diagram depicting the illustrates the conversion of B, P and I frames according to one embodiment of the present inventions.

FIG. 7 illustrates the conversion of frames so that each segment can be transcoded by itself without reference to knowledge within other segments. The beginning of a segment is always an I frame. Columns 1 and 4 are decoding order and columns 2 and 3 are display order in FIG. 7.

The first column of image frames in FIG. 7 depicts a sequence of images comprising a section of a particular program. In this case, there is a random access point coinciding with the position immediately preceding each of the two I-frames that are shown. However, it is important to distinguish between the ordering of the frames in the first and second columns. The first column depicts the ordering of frames as they are encountered in the compressed bit stream. This sequencing is known as decoding order. The second column depicts the true ordering of the frames, either before they are encoded or after they are decoded. This sequencing is referred to as presentation order. As mentioned previously, I-frames are encoded independently of all other frames, and therefore they may be decoded independently. P-frames are encoded by predicting forward from one or more previous frames. The encoder subtracts this prediction from the actual image frame and spatially encodes the resulting difference image. Although the decoder can decompress this encoded difference image, it cannot recover the P-frame unless it first recovers the one or more previous frames that were used to predict it. B-frames are similar to P-frames except the frames used to predict the image are not limited to previous frames. Typically, the B frame prediction is obtained by averaging the prediction derived by extrapolating the preceding I- or P-frame forward with the prediction formed by extrapolating the following I- or P-frame backwards. This means that the decoder cannot undo this process and recover the B-frame unless the future frame that was extrapolated backwards is transmitted first. For this reason, the decoding order will tend to differ from the presentation order (as shown in FIG. 7) whenever B-frames are present in the stream.

Also notice from FIG. 7 that the two B-frames immediately following each I-frame in the decoding order representation of column 1 are derived from the preceding I-frame and the preceding P-frame which also precedes the I-frame. This is more apparent in the second column presentation-order representation. Clearly the compressed stream cannot be simply partitioned in the vicinity of the I-frame random access point. The I-frame must be present in the second partition (segment n) in order to decode subsequent images and the two B-frames cannot be decoded in the second partition without the preceding P-frame nor can they be decoded in the first partition without the I-frame. This problem can be solved by converting the two B frames to P frames during the transcoding process as shown in the third column of FIG. 7. The transcoder assigned to segment n−1 continues to process the I-frame as well as the two following B-frames shown in the decoding order representation of the first column. However, once the two B-frames are reconstructed, the I-frame is no longer needed and may be dropped from this segment, and the two reconstructed B-frames converted to P-frames as shown in column 3 of FIG. 7. Alternatively, only the second B-frame might be converted to a P-frame, which would then be used as a backwards predictor for the first B-frame. That is, the first B-frame could remain as a B-frame as long as it is regenerated to account for this change in predictors. Once both frames have been reprocessed they are appended to the end of the first segment, and the next segment begins with the same I-frame that was used and subsequently dropped from the previous one.

The steps of converting image frames from one format to another involves complex decoding and encoding capabilities. Fortunately these are the same capabilities that are designed into the transcoder that is capable of modifying compression formats, image resolution, and data rates, in order to match the capabilities of a client device or the capacity of a distribution network. Therefore, it is recommended that the stream segmentation and image conversion steps be delegated to the transcoding modules and combined with the transcoding process. Once the stream has been reprocessed and restored to decoding order as shown in the fourth column of FIG. 7, the individual segments may be stored and managed either as a single stream or as a collection of independent segments.

There are several benefits associated with the process of partitioning all content into segments. For example, if a client chooses to switch programs or jump to random points within the same program during playback, then a new corresponding segment is prepared or retrieved from storage. Since the beginning of each new segment serves as a known random access point, the transition should always be seamless.

As mentioned previously, there may be a need to interrupt a low priority transcoding process in order to reassign transcoding resources to a high priority real-time request. If streams are partitioned into segments, then the time already spent processing the lower priority stream is not wasted. The segments that have already been processed are retained in the storage cache and the transcoding process may be restarted at the next segment when resources become available once again.

Figure 8:
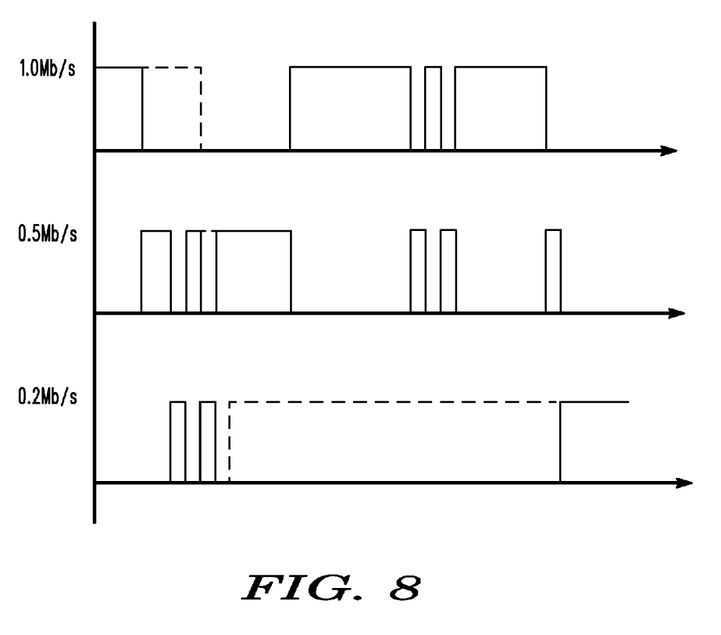
FIG. 8 illustrates a timing graph for the generation of segments at three data rates according to one embodiment of the present inventions.

It is interesting to consider the case where available network capacity varies as a stream is being transcoded in real-time and streamed to its destination. If network capacity decreases, then the transcoder module assigned to the next stream segment can be instructed to transcode to a lower data rate. By the time the entire program is delivered, the various segments may have been generated at multiple data rates as illustrated by the example of FIG. 8. In this case the first segments are generated at a data rate of 1 mb/s, followed by segments generated at 0.5 mb/s and 0.2 mb/s as the transcoders respond to decreasing network capacity. Consequently, if all of these segments are saved in the cache, and if the same program is later requested by a second client, it is likely that the data rates will not match the available network capacity if the same segments are requested the second time. The solution is to simply compare the network capacity with the available segments in cache at the time of the request. If a suitable segment is not available in cache, then the segment must be assigned to an available transcoder module and generated in real-time. Note, that it can be helpful to vary the definition of "suitable segment" depending on the availability of transcoding resources. If resources are scarce and if a lower quality compatible version of the same segment already exists in cache, then the lower quality version may be substituted instead.

By the time the entire program is delivered the second time, additional segments may have been added to the cache as illustrated by the dotted lines in FIG. 8. Each time a repeat request for the same program is received, a greater number of segments are likely to be found in the cache and therefore fewer segments will need to be generated in real time. It is also possible that missing segments may have been detected in advance by the Prioritizer and resulted in new entries being submitted to the Xcode Low Priority Queue. Assuming that transcoding resources are available to process these low priority requests, this can further increase the likelihood that the segments will be available in cache when needed.

The transcoding system is compatible with common streaming protocols such as the Apple Live Streaming format currently supported by Apple mobile devices and the Microsoft Smooth Streaming format currently supported by Silverlight platforms. Both Live Streaming and Smooth Streaming are HTTP-based and both require content to be separated into chunks. These chunks may or may not be equated or aligned with the segments that have been described in reference to the proposed transcoding system. Another feature that is common to both Live Streaming and Smooth Streaming is the ability to seamlessly adjust the data rate of the content that is being streamed. For example, with the Live Streaming format, a descriptor may be sent in response to a new client request. The descriptor includes a listing of one or more playlist files which the client may subsequently choose to request. Each of these one or more playlist files includes a complete list of file segments comprising the program. However, each playlist may correspond to a different data rate as specified by the bandwidth keyword in the descriptor. The receiver is free to switch from one file segment selected from a first playlist (first data rate) to a next file segment selected from a second playlist (second data rate). It is the responsibility of the transcoding and streaming system to insure that the segments listed in each playlist are compatible so that transitions between playlists will be seamless, and it is the responsibility of the receiving system to adjust to network conditions and select only the segments which the network is capable of delivering.

In the case of the proposed transcoding system, it is not necessary for file segments to be present in the storage array before they are included in the file listings referenced by the descriptor. For example, if an original copy of a program is available in storage, then a descriptor may be created with references to multiple files each with a corresponding different data rate, even though the segments listed in these files may not exist. Each time a request is received for a particular segment, the cache is checked to determine if the segment is present. If the segment is present then it is simply retrieved from the storage array and forwarded to the client. However, if the segment is not already present, then an entry is inserted into the Xcode High Priority Queue. When the entry is retrieved from the queue by the Xcode Manager, the corresponding section of the original file will be transcoded to meet the requirements of the client request. The processed segment is retained in cache in case the request is repeated at a later time or a similar request received from a different client.

As mentioned previously, the receiver determines which file segment to request when multiple data rate versions are available. The decision is implemented by examining the fullness of a buffer used to receive data as it is delivered via the network. If the data is arriving faster than it is being consumed, causing the buffer to become fuller and fuller, then the receiver may either switch to the file corresponding to a higher data rate, or it may simply delay sending a request for the next file segment. Similarly, if the data is arriving slower than it is being consumed and if this is causing the buffer to tend towards empty, then the receiver switches to a file with a lower corresponding data rate. In some cases, if a lower data rate option is not available, or if the adjustment process is too slow, the buffer may underflow forcing a pause during playback while waiting for the buffer to be replenished. Another potential problem arises if segments are being transcoded as the requests are received, and the transcoding system lacks sufficient margin for transcoding faster than real time. Consider, for example, the case where video is being transcoded in real-time and delivered to a client receiver. If the client is displaying the video at the exact same rate that the video is being delivered, then the fullness of the receiving buffer will remain approximately constant over time. However, the receiver may misinterpret the situation as it seeks to attain a more optimal buffer occupancy level. In this case, it is likely to assume that the buffer level is not increasing due to network bottlenecks, and that the occupancy level can be increased by switching to a lower data rate. In fact, since the bottleneck is the transcoding device and not the network, switching to a lower date rate will merely cause the video quality to degrade, and have no significant effect on the buffer occupancy level.

This problem can be addressed by introducing additional signaling mechanism not currently supported by existing streaming protocols. The receiver is incapable of making an intelligent data rate decision unless additional information is provided. Specifically, information is needed to determine if the delivery rate is limited by the network or by some other restriction such as the performance of a real-time transcoding device. This missing information could be provided in the form of private information between the streaming source and the client receiver, or alternatively, at regular intervals the streaming source could insert this information into existing headers reserved in accordance with the chosen container format for conveying video and audio streams. In either case, the information inserted at the streaming source would inform the receiver that the source is either keeping up with or lagging behind the requests that the receiver has submitted. If the source is keeping up, then the receiver could assume that delays are attributable to network congestion, and commence the transition to a lower data rate. However, if the source is not keeping up with the requests, then the receiver could assume that the delays are not due to the network, and therefore a reduction in data rate is not going to help.

The problem can also be addressed without introducing additional signaling between the source and the receiver. Instead, a determination as to the cause of delivery delays can be implemented at the source. For example, if the delays are due to the network, then the transcoding system may have completed the last request, and streaming may have backed up from the network into the storage array. It is straightforward to measure the time spent transcoding the response to each requested segment. It is also possible to measure the time spent transferring the transcoded data to the network although this may require monitoring of kernel-level networking functions. For example, both Live Streaming and Smooth Streaming are based on the HTTP protocol, and therefore network flows are managed and regulated by the Transmission Control Protocol (TCP) of the Internet Protocol Suite.

If the time spent transcoding a requested segment is less than the time spent forwarding the transcoded data to the network, then delays can be attributed to network congestion and managed by reducing the data rate. However, if the time spent transcoding is significantly greater than the time spent forwarding the resulting data to the network, then a simple reduction in data rate is unlikely to have any significant effect other than to reduce the quality of the video. In this case, a request for a reduction in data rate should be ignored, particularly if the time spent transcoding is less than the interval corresponding to the real-time duration of the segment. Although the buffer occupancy level at the receiver may be less than a predetermined optimal level, it is not likely to underflow. On the other hand, if the delays are attributed to the transcoder and the time spent transcoding exceeds the interval corresponding to the real-time duration of the segment, then one might assume that an underflow will occur if the discrepancy persists. This condition can be detected and used as a trigger to use any means available to accelerate the transcoding process. For example it may be possible to increase throughput by operating two or more transcoding modules in parallel. Depending on the transcoding algorithm and implementation, it may also be possible to significantly increase throughput by reducing the motion vector search range or number of reference frames used for prediction, or alternatively, the resolution or frame rate of the transcoded stream could be reduced. For example if the module is implemented by combining a hardware-accelerated decoder with an encoder implemented primarily in software, then the throughput may be limited by the speed of the encoder. However, if the decoded pixels are first decimated to a lower resolution, preferably using decimation filters implemented in hardware, then the encoding speed may increase in inverse proportion to the reduced number of pixels.

The media transcoder can operate at various efficiencies which affect performance quality. A reduced compression efficiency yields a higher performance quality. The media transcoder reduces compression efficiency when insufficient resources are available to service requests in the high priority queue.

Finally, it is useful to describe the statistical advantages achievable with a proper balance of transcoding and storage resources. If there are insufficient transcoding resources, then more storage devices will be needed to maintain the various representations needed to achieve a satisfactory level of compatibility with the various client devices. However, the system will be much less capable of generating the multiple representations needed to fill the larger storage system, and long intervals may transpire before new content becomes accessible to otherwise incompatible clients. The system will also be slow in adjusting to changes in content priority due to constantly changing viewing preferences and habits. In fact, increasing the amount of storage may not increase the probability of content being available if transcoding capacity is insufficient. On the other hand, if storage capacity is insufficient, then compatible content is less likely to be found in cache and therefore more content will need to be transcoded. Conceivably, the cache could be eliminated entirely and the transcoders relied upon exclusively. However, this is not an economical option as transcoders are relatively expensive. For example, if the cost of a transcoder capable of processing a single high definition stream is equivalent to the cost of a terabyte of storage, then the single transcoder could be replaced with enough storage to accommodate 15 days of high definition programming. But even if cost is not considered, it may not be practical to build a cache-less transcoding system that can match the capacity of a similar system with an inexpensive cache. In this same example, the transcoder which serves a single stream at a time can be contrasted with the single terabyte hard disk which may simultaneously serve more than 100 streams before running out of bandwidth. Space, power, and cooling restrictions alone may prevent the cache-less transcoding system from being scaled to keep up with demand.

The combined transcoding and storage system that has been described offers a simple solution to the problem of achieving an optimal balance of transcoding and storage resources. The prioritizer can determine whether more cache and more transcoding resources are needed by comparing priorities of a next entry in the low priority queue and a next entry in the delete queue. This rebalancing need can be implemented by human intervention to add or take away blades in a server. In the case of a lease, where resources are available, automatically made available as needed to just pay for them when needed and used.

Consider the Xcode High Priority Queue in FIG. 2. If this queue becomes full then new client requests must be rejected, but it remains unclear if the problem is due to insufficient storage resources (and hence the reason for the transcoding requests) or if it is due to insufficient transcoding resources, or if the problem is due to a shortage of both storage and transcoding resources. The same uncertainty remains if the transcode modules are monitored to determine how often they are fully utilized. Heavy utilization will be the result if there is either an insufficient number of transcoders or an insufficient amount of cache storage. However, the question can be answered by comparing the priority of the entry at the head of the Xcode Low Priority Queue with the priority of the entry at the head of the Delete Queue. Recall that the Delete Queue contains the list of files that are next in line for deletion from the cache. If this next entry to be deleted has higher priority than the next entry from the Xcode Low Priority Queue, then this is an indication that the transcoder is blocked and unable to generate new content for the cache since this would cause higher priority content to be deleted. This situation can be remedied by increasing the size of the cache. Alternatively, if the entry at the head of the Deletion Queue is lower than the priority of the next entry from the Xcode Low Priority Queue then this indicates that the system will benefit from additional transcoding modules. Finally, if the two priorities are approximately equal then the system is suitably balanced. However, capacity can still be increased (for example if the Xcode High Priority Queue becomes full from time to time) by investing in both additional cache storage modules and additional transcoding modules.

Any signal processing techniques disclosed herein with reference to the accompanying drawings are preferably implemented on one or more digital signal processors (DSPs) or other microprocessors. Nevertheless, such techniques could instead be implemented wholly or partially as discrete components or hardwired circuits. Further, it is appreciated by those of skill in the art that certain well known digital processing techniques are mathematically equivalent to one another and can be represented in different ways depending on choice of implementation.

Any letter designations such as (a) or (b) etc. used to label steps of any of the method claims herein are step headers applied for reading convenience and are not to be used in interpreting an order or process sequence of claimed method steps. Any method claims that recite a particular order or process sequence will do so using the words of their text, not the letter designations.

Unless stated otherwise, terms such as "first" and "second" are used to arbitrarily distinguish between the elements such terms describe. Thus, these terms are not necessarily intended to indicate temporal or other prioritization of such elements.

Any trademarks listed herein are the property of their respective owners, and reference herein to such trademarks is generally intended to indicate the source of a particular product or service.

Although the inventions have been described and illustrated in the above description and drawings, it is understood that this description is by example only, and that numerous changes and modifications can be made by those skilled in the art without departing from the true spirit and scope of the inventions. Although the examples in the drawings depict only example constructions and embodiments, alternate embodiments are available given the teachings of the present patent disclosure.

What is claimed is:

1. A media management system for managing both live and offline transcoding of media, comprising:
    a prioritizer to manage offline transcoding requests;
    a low priority queue operatively coupled to the prioritizer to receive offline transcoding requests;
    a high priority queue operating at a higher priority than the low priority queue and operatively coupled to receive live transcoding requests from a client on the network;
    a media transcoder operatively coupled to the low priority queue and the high priority queue to primarily transcode media in accordance with requests from the high priority queue for delivery to a client on the network and then secondarily transcode media in accordance with requests from the low priority queue when the high priority queue is empty;
    a cache operatively coupled to the media transcoder to store the media transcoded by the transcoder;
    a delete queue operatively coupled to the cache and the prioritizer to save delete requests corresponding to media in the cache in a priority; and
    wherein the prioritizer is operatively couple to the cache and additionally manages persistence of the media retained in the cache; and
    wherein the prioritizer gives lower delete queue priority for media requests that would consume more transcoding resources than similar kinds of media requests that would consume less transcoding resources if deleted media were later regenerated by transcoding after deletion.

2. A media management system according to claim 1,
wherein the transcoder is operatively coupled to receive live media from the cache for transcoding and subsequent delivery to the client on the network; and
wherein the high priority queue includes requests for live video including real time live media that has previously been stored in the cache.

3. A media management system according to claim 1,
wherein the transcoder is operatively coupled to receive real time live media for transcoding and subsequent delivery to the client on the network; and
wherein the high priority queue includes saved requests for live video including real time live media that has not previously been stored in the cache.

4. A media management system according to claim 1, wherein the transcoder operates faster than real time.

5. A media management system according to claim 1, wherein the prioritizer causes transcoding of a next request from the low priority queue when there is both no pending request from the high priority queue and a priority of the next entry from the low priory queue is higher than a priority of a next delete request entry in the delete queue.

6. A media management system according to claim 1, wherein the prioritizer determines whether more cache and more transcoding resources are needed by comparing priorities of a next entry in the low priority queue and a next entry in the delete queue.

7. A media management system according to claim 6, wherein the prioritizer indicates more transcoding resources are needed when the next entry in the low priority queue has a higher priority than the next entry in the delete queue and indicates more cache resources are needed when the next entry in the delete queue has a higher priority than the next entry in the low priority queue.

8. A media management system according to claim 1, wherein the media transcoder reduces compression efficiency when insufficient resources are available to service requests in the high priority queue.

9. A media management system according to claim 1, wherein the media transcoder increases compression efficiency when there are no requests in the high priority queue.

10. A media management system according to claim 1, wherein the prioritizer detects if throughput is limited by transcoder throughput rather than network throughput and disables requests for lower quality.

11. A media management system according to claim 1, wherein the media transcoder is operatively coupled to transcode media into segments and to modify frames when necessary to insure that they are decodable without accessing other segments.

12. A media management system according to claim 11, wherein the media transcoder is operatively coupled to transcode media into segments that each begin with I frames and within each segment to convert certain B frames to P frames if decoding of said certain B frames would require access to frames in other segments.

13. A media management system according to claim 11, wherein after segmenting, the media transcoder interrupts and resumes transcoding based on current priorities from the high and low priority queues.

14. A media management system according to claim 11, wherein the prioritizer indicates to the client over the network that segments are available even if they do not exist if they can be derived by transcoding a different segment that does exist.

15. A media management system, comprising:
a prioritizer to manage transcoding of segments;
a transcoding queue operatively coupled to the prioritizer to save transcoding requests;
a media transcoder operatively coupled to the cache and the priority queue to transcode media into segments and to modify frames when necessary to insure that they are decodable without accessing other segments;
a cache operatively coupled to the media transcoder to store the media transcoded by the transcoder; and
a delete queue operatively coupled to the cache and the prioritizer to save delete requests corresponding to media in the cache in a priority; and
wherein the prioritizer is operatively couple to the cache and additionally manages persistence of the media retained in the cache; and
wherein the prioritizer gives lower delete queue priority for media requests that would consume more transcoding resources than similar kinds of media requests that would consume less transcoding resources if deleted media were later regenerated by transcoding after deletion.

16. A media management system according to claim 15, wherein the media transcoder transcodes media into segments that each begin with I frames and when necessary within each segment converts certain B frames to P frames if decoding of said certain B frames would require access to frames in other segments.

17. A media management system according to claim 16, wherein lower quality segments are retrieved from the cache when transcoding resources are unavailable.

18. A media management system according to claim 15, wherein the prioritizer detects if throughput is limited by transcoder throughput rather than network throughput and disables requests for lower quality.

19. A media management system according to claim 15, wherein the prioritizer indicates to the client over the network that segments are available even if they do not exist if they can be derived by transcoding a different segment that does exist.

20. A media management system according to claim 15, wherein the prioritizer is operatively coupled to the cache and additionally manages persistence of the media retained in the cache.

21. A method of managing both live and offline transcoding of media, the method comprising the steps of:
(a) managing priorities of offline transcoding requests;
(b) receiving offline transcoding requests and saving the received offline transcoding requests in a low priority queue;
(c) receiving live transcoding requests from a client on the network and saving the received live transcoding requests in a high priority queue operating at a higher priority than the low priority queue;
(d) primarily transcoding media in accordance with requests from the high priority queue of said step (c) for delivery to a client on the network;
(e) secondarily transcoding media in accordance with requests from the low priority queue of said step (b) when the high priority queue is empty;
(f) storing the media transcoded by the transcoding of steps (d) and (e) in a cache; and
(g) saving delete requests corresponding to media in the cache in a delete queue in a priority; and
wherein said step (a) of managing priorities of offline transcoding requests comprises the substep of (a1) giving lower delete queue priority for media requests that would consume more transcoding resources than similar kinds of media requests that would consume less transcoding resources if deleted media were later regenerated by transcoding after deletion.

22. A method of managing both live and offline transcoding of media according to claim 21, wherein said step (a) of managing priorities of offline transcoding requests further comprises the substep of (a2) managing persistence of the media retained in the cache.

\* \* \* \* \*